(12) United States Patent
Viitanen et al.

(10) Patent No.: US 8,159,847 B2
(45) Date of Patent: Apr. 17, 2012

(54) METHOD AND ARRANGEMENT IN CONNECTION WITH A BRAKE CHOPPER

(75) Inventors: Tero Viitanen, Vantaa (FI); Ora Veli-Matti Leppänen, Helsinki (FI)

(73) Assignee: ABB Oy, Helsinki (FI)

( * ) Notice: Subject to any disclaimer, the term of this patent is extended or adjusted under 35 U.S.C. 154(b) by 399 days.

(21) Appl. No.: 12/418,139

(22) Filed: Apr. 3, 2009

(65) Prior Publication Data

US 2009/0267545 A1   Oct. 29, 2009

(30) Foreign Application Priority Data

Apr. 24, 2008  (EP) .................................. 08155083

(51) Int. Cl.
*H02M 3/24* (2006.01)
*H02M 5/45* (2006.01)
(52) U.S. Cl. ..................... 363/98; 363/37; 363/56.02
(58) Field of Classification Search .......... 318/741, 318/757, 759; 363/56.02, 56.03, 98, 132, 363/37
See application file for complete search history.

(56) References Cited

U.S. PATENT DOCUMENTS

| 5,982,136 | A | | 11/1999 | Pelly |
| 6,166,512 | A | * | 12/2000 | Kojima ........................ 318/759 |
| 7,141,947 | B2 | * | 11/2006 | Pispa ............................ 318/380 |
| 7,190,599 | B2 | * | 3/2007 | Virolainen et al. ............. 363/98 |
| 7,414,425 | B2 | * | 8/2008 | O'Gorman et al. ...... 324/765.01 |
| 2005/0152165 | A1 | | 7/2005 | Virolainen et al. |
| 2005/0248361 | A1 | | 11/2005 | O'Gorman et al. |

FOREIGN PATENT DOCUMENTS

| EP | 1 553 692 A2 | 7/2005 |
| EP | 1 596 491 A2 | 11/2005 |

OTHER PUBLICATIONS

European Search Report dated Oct. 28, 2008.
Frede Blaabjerg, "Single Current Sensor Technique in the DC Link of Three-Phase PWM-VS Inverters: A Review and a Novel Solution", IEEE Transactions on Industry Applications, Sep./Oct. 1997, p. 1241-1253, vol. 33, No. 5.

* cited by examiner

*Primary Examiner* — Jessica Han
(74) *Attorney, Agent, or Firm* — Buchanan Ingersoll & Rooney PC

(57) ABSTRACT

A method of controlling a brake chopper and a control arrangement, the brake chopper being connected between the positive and the negative rails of an intermediate voltage circuit feeding an inverter bridge, wherein current measurement means are arranged between a DC voltage source and the brake chopper and adapted to measure DC current flowing in the intermediate voltage circuit, which method comprises steps of forming with the inverter bridge an output voltage to a load connected to the output of the inverter bridge, determining a time instant when the DC current of the intermediate circuit is sampled, and preventing the use of the brake chopper at the determined time instant.

8 Claims, 4 Drawing Sheets

METHOD AND ARRANGEMENT IN CONNECTION WITH A BRAKE CHOPPER

FIELD OF THE INVENTION

The present invention relates to controlling a brake chopper, and more particularly to a method and an arrangement in which a brake chopper is used in connection with DC-current measurement of an inverter bridge.

BACKGROUND OF THE INVENTION

Brake choppers are commonly used in frequency converters for dissipating regenerated energy that cannot be fed back to the supplying network. For example in a case where a motor supplied by a frequency converter with a DC voltage intermediate circuit is rotated by the load, the motor acts as a generator and feeds power back to the supply. When the rectifying bridge of the frequency converter is not configured to feed the regenerated power back to the network, the voltage of the intermediate circuit starts to increase.

When the voltage of the intermediate circuit has increased to a limit which is higher than the nominal voltage of the intermediate circuit, the brake chopper, which is a circuit comprising a controllable switch and a resistor connected between the rails of the intermediate circuit, activates and starts to dissipate the energy in the resistor and thereby reduces the voltage. The brake chopper reduces the voltage until it is within acceptable limits from the nominal voltage.

The brake choppers operate based on measured voltage of the intermediate voltage circuit, independently of the other controls of the frequency converter. This means that when the voltage of the intermediate circuit rises above the set limit, the brake chopper starts its operation based on the voltage independent of other control operations carried out at the same time. The operation of the brake chopper may be based for example on pulse width modulation. According to the PWM operation principle a switching period is determined and the brake resistor is kept in operation inside the switching period for a time period that is dependent on the magnitude of the voltage. The simplest solution for the operation of a brake chopper is, however, to keep the resistance connected between the rails of the intermediate voltage until the voltage has decreased to an acceptable level.

Brake choppers are especially used in low-cost and smaller size frequency converters or in situations where the regenerated energy cannot be fed back to the supplying network. In low-cost and smaller size frequency converters the additional cost of a rectifier which could feed power back to the supplying network would increase the costs and make the converter less appealing. Further on small power levels the amount of power dissipated in the chopper resistor is relatively small.

FIGS. 1, 2 and 3 show typical semiconductor modules for use in a power device, such as a frequency converter. These kinds of internally connected modules are cost effective building blocks that are commonly used in frequency converters. The module in each of the FIGS. 1, 2 and 3 comprises an inverter bridge 2 and a brake chopper 1. The module comprises phase outputs A, B, C, inputs for intermediate circuit UDC+, UDC− and a connection point for brake resistance BRK. The brake resistance is connected to the module between the positive intermediate circuit connection point UDC+ and the connection point BRK.

In FIG. 1 the inverter part 2 and the brake chopper 1 are not connected internally to each other. Thus one can add electrical components between these parts of the module. Components that may be inserted between the inverter and brake chopper include, for example, capacitors and measurement devices. In the module of FIG. 2 the inverter part 2 and the brake chopper 1 are connected together internally in the positive rail UDC+ of the intermediate circuit i.e. the positive end of the brake chopper is connected to the inverter part and the negative end is left unconnected. In the module of FIG. 3 the inverter 2 and the brake chopper 1 are internally connected together, giving no possibility of inserting electrical components between the inverter and the brake chopper.

Another feature in frequency converters that is often used for lowering the costs is the determination of motor phase currents by using only one current sensing device. This device is arranged to measure DC current in the intermediate circuit. Although only one measurement is obtained, the measured value can be allocated to a specific motor phase once the inverter switch combination during the time of the measurement is known. In FIGS. 1 and 2 this kind of measurement device can be connected between the brake chopper and the inverter, whereas in case of the module of FIG. 3, the measurement device has to be connected to the DC side of the brake chopper.

It has been noticed that the structure of FIG. 3 with DC current measurement from the DC intermediate circuit is problematic. This is due to the fact that current flowing through the brake chopper sums to the motor current and the current sensing device senses the summed current. If the current detection device is arranged in the structure of FIG. 3, the detected current is different than the phase current. This is further illustrated in FIGS. 4 and 5.

FIGS. 4 and 5 show the module of FIG. 3 connected to a motor and having current measurement arranged to the intermediate circuit. In FIG. 3 the controllable switch 5 of the brake chopper is in an open state and current cannot flow via the brake resistor R. Since the state of the inverter switches is 100, i.e. phase A is connected to positive intermediate circuit voltage UDC+ and phases B and C are connected to negative intermediate circuit voltage UDC−, the current measurement device 3 detects current IDC, which corresponds to the current of output phase A.

FIG. 5 shows the same output switch combination as in FIG. 4. Now the switch 5 of the brake chopper is conducting, and certain amount of current flows via the brake resistor R. The braking current, i.e. the current via the brake resistor, is shown in dashed line, and it can be seen that it closes via the current measurement device 3, which is arranged on the DC side of the brake chopper i.e. between the DC voltage source and the brake chopper. This current is summed with the motor phase current and the measurement does not give the desired value of phase current.

One possible way of dealing with the above problem is to calculate the magnitude of the current in the brake resistor and to subtract the calculated value from the measured one. The outcome of this subtraction would then be the desired current of the inverter bridge. This kind of approach requires information on the resistance of the used brake resistor, and brake chopper state information i.e. whether the chopper is conducting or not at the time of the current sample. The resistance can be identified during start-up of the converter, but since the resistance is dependent on the temperature, the identified value would not necessarily be valid during operation. This would directly distort the calculated result and render it useless. Further the voltage information needed in calculation of current according to Ohm's law should be measured accurately and simultaneously with the DC current for the calculated current to be accurate.

Another problem relating to DC current measurement and subtraction of braking current from the measured DC current is the saturation of the current measurement device. The sum of the inverter and brake resistor current can be so high that the current measurement device is saturated. DC current can be determined using a shunt resistor, and the measurement result is provided from the shunt resistor using an operational amplifier. Since the output of the operational amplifier cannot be higher than its positive operational voltage, a risk of saturation is evident. In this kind of situation the subtraction of braking current would be carried out from already distorted measurement, and the end result would also be erroneous.

BRIEF DESCRIPTION OF THE INVENTION

An object of the present invention is to provide a method and an arrangement for implementing the method so as to solve the above problem. The objects of the invention are achieved by a method and an arrangement which are characterized by what is stated in the independent claims. The preferred embodiments of the invention are disclosed in the dependent claims.

The invention is based on the idea of synchronizing the use of the brake chopper with the current measurement.

An advantage of the method and apparatus of the invention is that the measurement of inverter bridge current can be made accurately by using DC current measurement even if the current measurement is carried out from the DC side of the brake chopper.

The invention allows using a cost effective and accurate current measurement in a frequency converter, which further enables accurate control of the controlled electrical machine. The invention is especially suitable to be used in connection with a modulation scheme where only one zero vector is used in each control period.

BRIEF DESCRIPTION OF THE DRAWINGS

In the following the invention will be described in greater detail by means of preferred embodiments with reference to the accompanying drawings, in which.

DETAILED DESCRIPTION OF THE INVENTION

According to the present invention, an output voltage is formed with the inverter bridge to a load that is connected to the output of the inverter bridge. The inverter bridge is usually used as the output stage of a frequency converter. Inverter bridges can, however, be also connected directly to a DC source without an inverter bridge specific rectifier part.

Figure 6:
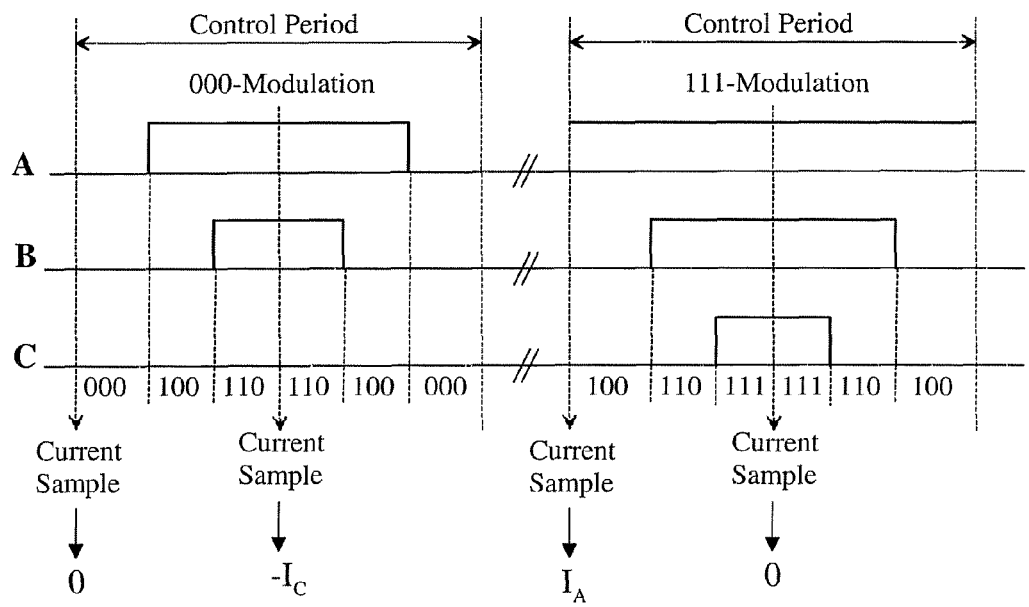
FIG. 6 shows an example of control periods with current sampling.

The inverter bridge generates output voltage that has an average voltage corresponding to the desired voltage. Typically output voltage is controlled to the desired voltage within a control period. The control period is a time period in which the time average of the inverter output voltage corresponds to the desired value. FIG. 6 shows one example of modulation of output switches.

Figure 1:
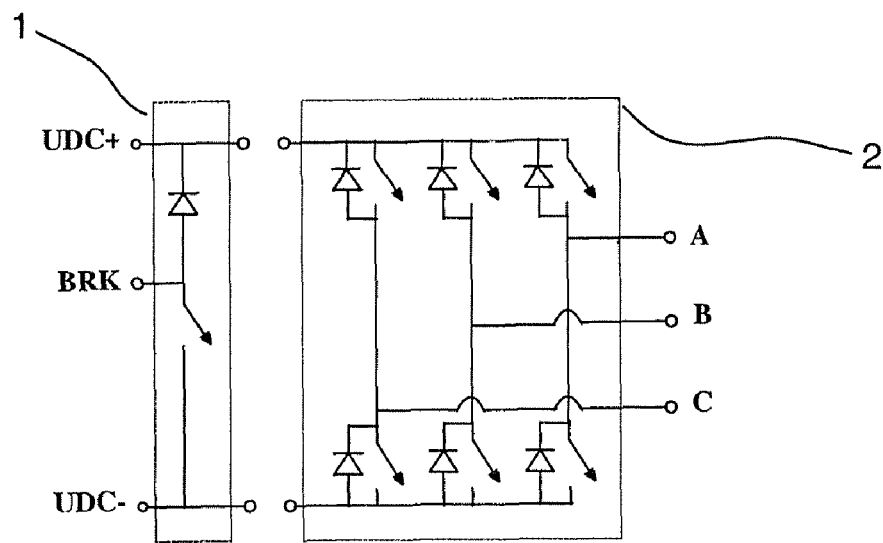
FIGS. 1, 2 and 3 show modules including a brake chopper and an inverter bridge.
Figure 2:
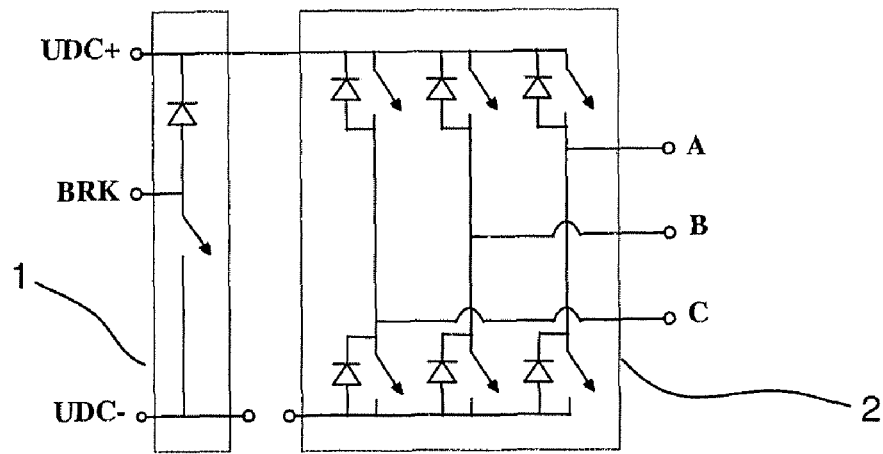
Figure 3:
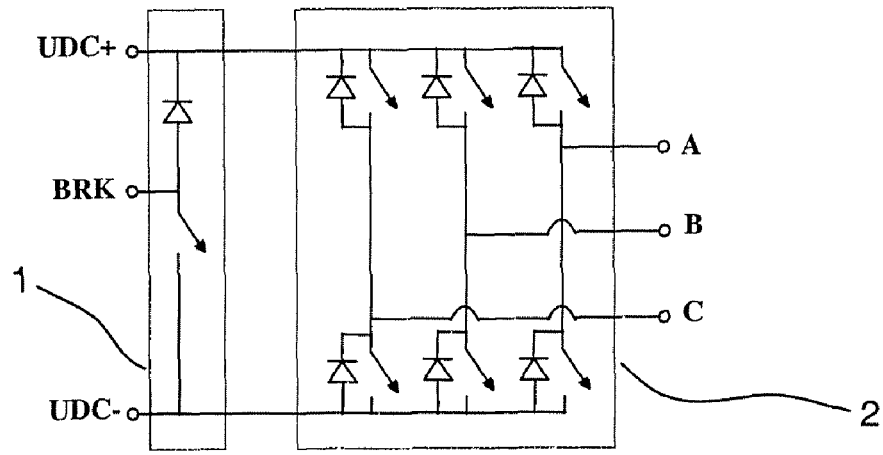
Figure 4:
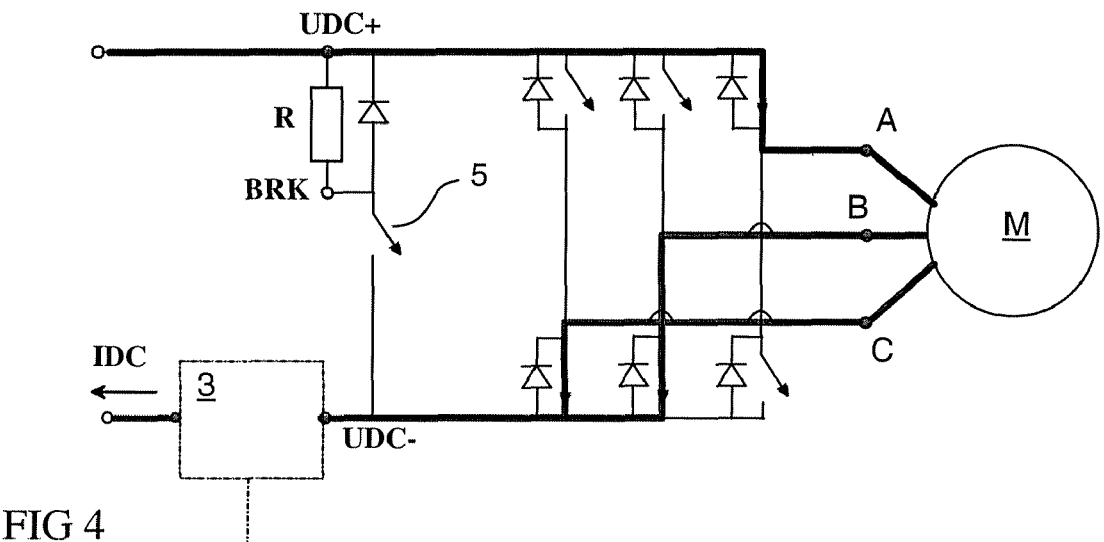
FIG. 4 shows current measurement from the DC current of the intermediate voltage circuit of an inverter when the brake chopper is inactive.
Figure 5:
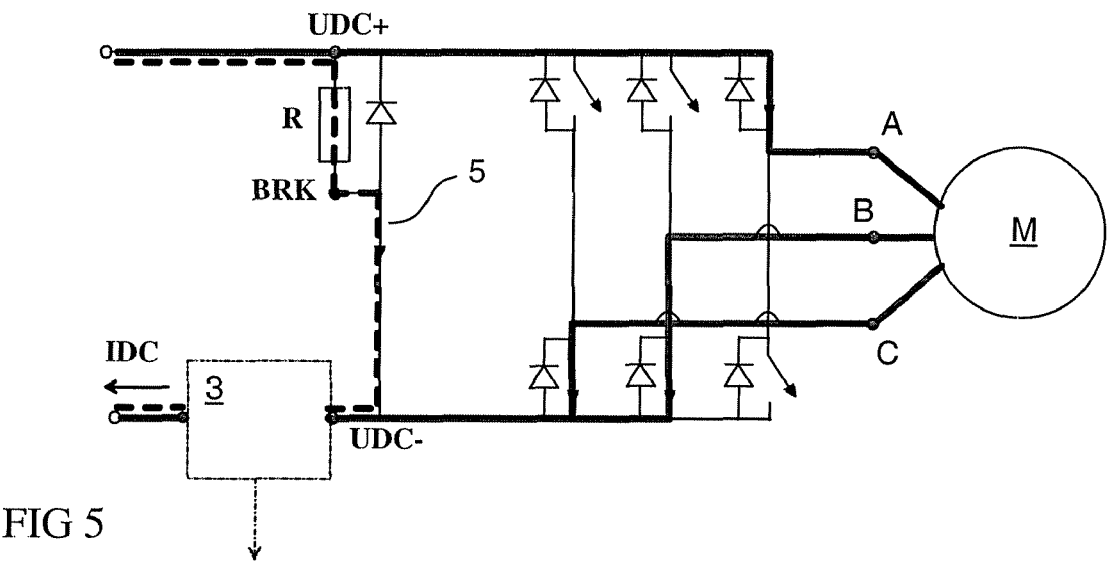
FIG. 5 shows current measurement from the DC current of the intermediate voltage circuit of an inverter when the brake chopper is active.

In the example of FIG. 6 the states of output phases A, B, C are shown as either high or low. In the high state the respective phase output is connected to the positive voltage of the intermediate circuit and in the low state the phase output is connected to the negative voltage. These high and low states are also referred to as 1 and 0, respectively. Inside the control or modulation period the states of the output switches are changed to obtain the desired average voltage. The switching state is presented conveniently by using symbols '1' and '0' to represent the state of each output phase, as also shown in FIG. 6. The first control period of FIG. 6 (000-modulation) begins with state '000', which means that all output phases are connected to the lower potential of the intermediate circuit. The '000' state is conventionally called a lower zero vector and it means that no active voltage vector is connected to the load. After the '000' state, phase A is connected to the high potential of the intermediate circuit and thus the state changes to '100', which state is also shown in FIGS. 4 and 5.

In the modulation scheme shown in FIG. 6 only two phases are modulated during one control period. This further means that only one zero vector is used in a control period. In the 000-modulation of FIG. 6 the used zero vector is '000' while in the 111-modulation the used zero vector is '111', also called an upper zero vector. This modulation principle is described in greater detail in document EP 1553692 A2. As mentioned above, in this modulation scheme only two phases are modulated in one control period and thus only one zero vector is used in one control period and the used zero vector is changed actively. The use of only one zero vector in a control period results in modulation patterns as shown in the example of FIG. 6. In general, if all phases are in the same potential (000 or 111), it is considered as a zero vector (lower or upper). If one phase is in different potential than the other two (100, 110, 010, 011, 101 or 001), it is considered as an active vector.

The modulation patterns in FIG. 6 ensure that a valid DC current sample can be taken either in the middle or at the beginning/end of a control period. FIG. 6 shows two current samples in a control period i.e. at the beginning and in the middle of the control period. In 000-modulation the current sample taken at the beginning of the control period results in 0, since all the output switches are controlled to the negative potential of the intermediate voltage and the inverter bridge has no currents. In the middle of the control period the output voltage vector is '110' and the sampled current corresponds to current flowing out from phase C i.e. $-I_C$. Thus when 000-modulation is used, the valid current sample can be taken in the middle of the control period.

In case of 111-modulation of FIG. 6 the current sample taken at the beginning of the control period yields a valid current sample, which is in the case of the example $I_A$. The sample taken in the middle of 111-modulation period results in a zero current since all the output phases are connected to the positive potential of the intermediate circuit.

In the above certain time instants in a control period are referred to as beginning or end of the control period and middle of the control period. These definitions of time instants refer to the control periods shown in the drawings. The modulation inside a control period can be changed by changing the order in which the voltage vectors are generated. Thus the references to certain time instants of the control period have to be understood in the light of the drawings.

According to the present invention a time instant is determined when the DC current of the intermediate circuit is sampled. In case of the above described modulation scheme the time instant is determined based on the used zero vector. When the used zero vector is '111', the time instant for the current sample is at the beginning or at the end of the control period, and when the used zero vector is '000', the time instant for the current sample is in the middle of the control period. As mentioned above, the control period is a time period during which the average output voltage corresponds to the desired voltage. The modulation pattern is thus generated before each control period, and the used zero vector is also known before the start of each control period. Since the used zero vector is known, so is also the time instant for the current sampling.

According to the present invention the use of the brake chopper is prevented at the determined time instant. When the time instants for the current samples are known, the use of the brake chopper is blocked or the brake chopper is controlled to short the brake resistor. When the use of the brake chopper is blocked, it means that the brake chopper is not currently in active use and cannot be turned on even if the voltage of the intermediate circuit rose above the set limit.

When the brake resistor is in use, it will be temporarily taken out of use for the time of the current sampling. This way the brake resistor is taken out of use during the current sampling, irrespective of whether the intermediate voltage is above the set limit for chopper operation or not. By forcing the brake chopper to a state where the intermediate voltage is not lowered, the current samples obtained at that time represent the correct phase current values.

If the used zero vector in the above described modulation scheme is changed after a fixed number of control periods, the logic needed for the operation of the present method can be reduced. The control of the brake chopper can be synchronized to the control period, and at the defined time instant after the beginning of the control period the brake chopper is disabled. If the number of successive control periods with the same zero vector is fixed, the control of the brake chopper may also calculate the control periods and change the blocking instant inside the control periods when the used zero vector is known to change.

Figure 7:
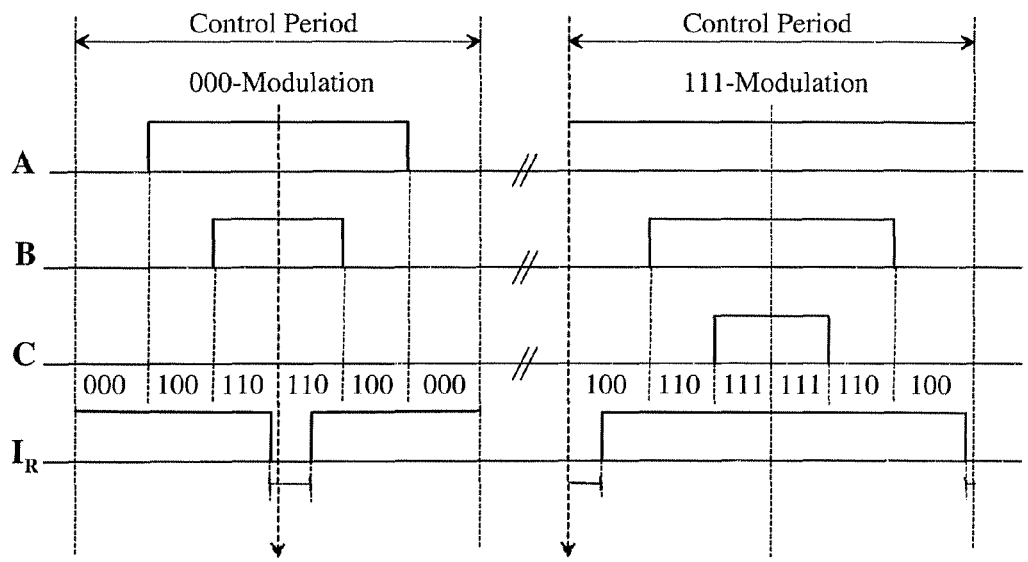
FIG. 7 shows control periods of FIG. 6 together with an example of braking current.

When the use of the brake chopper is prevented at the determined time instant, it means that the delays in the physical structure are also taken into account. FIG. 7 shows the control periods of FIG. 6 in a situation where the voltage of the intermediate circuit is above the limit triggering the use of the brake chopper, and the braking current $I_R$ resulting from the high intermediate circuit voltage is also shown in FIG. 7. The brake chopper is disabled in FIG. 7 for the times when the current $I_R$ is zero. The time instants are in fact extended to time periods extending both prior to and after the current sampling instant. By this extension it is ensured that the current through the brake switch is surely at zero and that no transients can affect the measurement. In FIG. 7 the time period without current in the brake resistor is somewhat exaggerated for illustrative purposes, and typical duration of the blocking period would be in the range of approximately 1% of the duration of the control period.

According to an embodiment of the invention the time instants for the prevention of the use of the brake chopper are determined based on where the zero vector is situated inside the control period. If the zero vector is at the beginning or at the end of the control period, then the valid current sample is taken in the middle of the control period and thus the use of the brake chopper is disabled at that time. If, on the other hand, the zero vector is in the middle of the control period, the operation of the brake chopper is disabled at the beginning or at the end of the control period.

According to an embodiment of the invention the use of the brake chopper is prevented twice in each control period, i.e. at the beginning and in the middle of each control period. With this embodiment the brake chopper needs only to be synchronized to the control period and no other controls are necessary. Current samples are taken at one of the blocked instants and thus the other blocking instant is not necessary for the accuracy of the current sampling. This kind of use of the chopper would make the switching frequency of the chopper twice as high as the switching frequency of the inverter, which would make the losses of the chopper switch high. In case the switch is able to thermally withstand such a high switching frequency, the embodiment is attractive in its simplicity. Although this embodiment doubles the time when the brake resistor cannot be used in lowering the voltage, the braking is still effective in lowering the intermediate voltage to acceptable values.

The method of the invention is described above with reference to a specific modulation technique. It is however clear that the present invention can be used in connection with other modulation types. In inverters having current measurement from the DC current, the current sampling is usually somehow synchronized to the control period to ensure proper current samples. This synchronization of current sampling to the control period also means that the information on the timing of the sampling is readily usable also for control of the brake chopper.

Even if the current samples are not taken at a specific time instant, but at random time instants, the present invention is still usable. The random sampling is not an effective solution, since there is no guarantee that the taken sample is a valid sample that gives a true phase current value for a certain phase. This kind of sampling also requires that the switching combination that was in use at the time of the sample can be determined. The blocking of the use of the brake chopper should be started as soon as the decision on current sampling is made. Further the current sampling can also be delayed to ensure that the brake resistor is surely short circuited. In this case the taking of the sample can also be delayed since the sample is not tied to a certain time instant in a control period.

Figure 8:
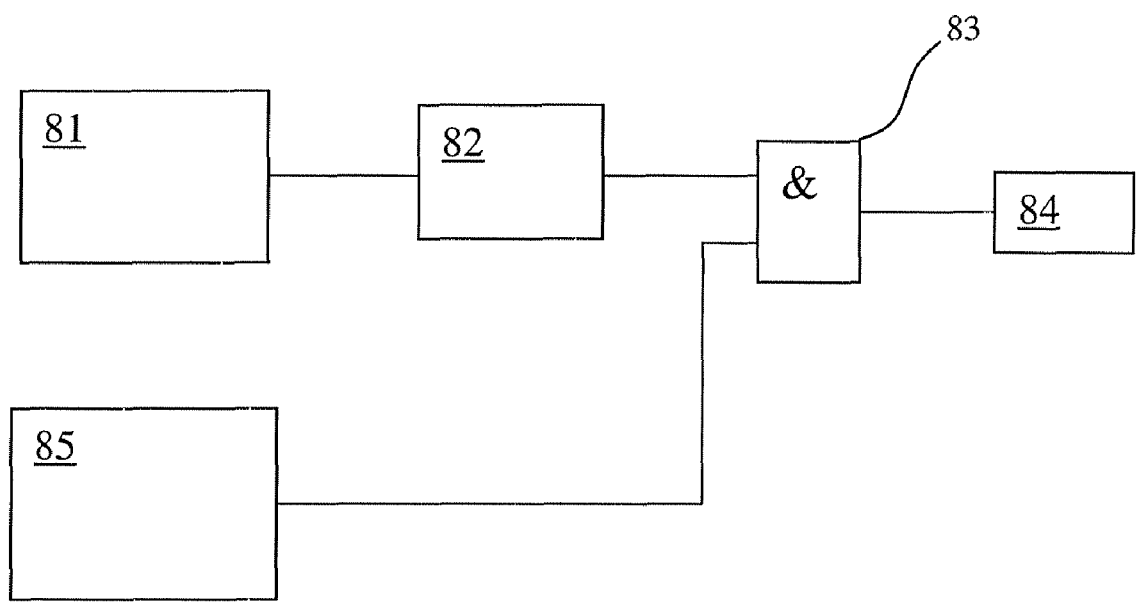
FIG. 8 shows a block diagram of the arrangement of the invention.

FIG. 8 is a block diagram depicting the arrangement of the invention. FIG. 8 shows means 81 for measuring the intermediate voltage. From the intermediate voltage brake control block 82 determines if the brake chopper 84 should be taken into use. The arrangement of the invention comprises means 85 for determining the time instant when the DC current of the intermediate circuit is sampled. In the example of FIG. 8 these means are implemented in the modulator. The function of the modulator is to give the switch combinations to circuits that drive the output switches. Thus the modulator can also give timing to the current measurement and for blocking the use of the brake chopper.

Further the arrangement of the invention comprises means 83 for preventing the use of the brake chopper at the determined time instant. These means 83 receive inputs from means 85 for determining timing information and from the brake control block 82. In FIG. 8 the means for preventing the use of the brake chopper are implemented as an AND circuit. If both of the inputs to the AND circuit are in a high state, also the output of the AND circuit is high. The output of the AND circuit is further connected to the brake chopper. Thus the control of the brake chopper can be either enabled or disabled depending on the signal state given by the modulator 85. If the output of the modulator signal connected to the AND circuit is high, meaning that no current samples are taken, then the signal from block 82 can pass to the brake chopper. If, on the other hand, the output of the modulator to the block 83 is low, then a current sample is being taken, and the control of the brake chopper is blocked.

It is clear to a skilled person that the arrangement can be implemented in various other ways. For example the AND circuit 83 can be substituted with a change over switch that changes its state on the basis of signal from the modulator 85.

It will be obvious to a person skilled in the art that, as the technology advances, the inventive concept can be implemented in various ways. The invention and its embodiments are not limited to the examples described above but may vary within the scope of the claims.

The invention claimed is:

1. A method of controlling a brake chopper, the brake chopper being connected between the positive and the negative rails of an intermediate voltage circuit feeding an inverter bridge, wherein current measurement means are arranged between a DC voltage source and the brake chopper and adapted to measure DC current flowing in the intermediate voltage circuit, which method comprises steps of:
   forming, with the inverter bridge, an output voltage to a load connected to the output of the inverter bridge,
   determining a time instant when the DC current of the intermediate circuit is sampled, and
   preventing the use of the brake chopper at the determined time instant.

2. A method according to claim 1, wherein the step of forming of the output voltage to the load with the inverter bridge comprises a step of
   forming an output voltage vector in each control period by using only one zero vector and one or two active vectors; and
   determining the time instant comprises the steps of
   choosing the time instant to be in the middle of the control period if the formed output voltage vector sequence comprises a zero vector '000', and
   choosing the time instant to be at the beginning or at the end of the control period if the formed output voltage vector sequence comprises a zero vector '111'.

3. A method according to claim 2, wherein the step of determining the time instant comprises steps of
   synchronizing the brake chopper with control periods of the inverter control, and
   receiving information from the used zero vector from a modulator.

4. A method according to claim 1, wherein the step of forming the output voltage to the load with the inverter bridge comprises a step of
   forming an output voltage vector in each control period by using only one zero vector and one or two active vectors; and
   determining the time instant comprises the steps of
   choosing the time instant to be in the middle of the control period if the zero vector is at the beginning or at the end of the control period, and
   choosing the time instant to be at the beginning or at the end of the control period if the zero vector is in the middle of the control period.

5. A method according to claim 4, wherein the step of determining the time instant comprises steps of
   synchronizing the brake chopper with control periods of the inverter control, and
   receiving information from the used zero vector from a modulator.

6. A method according to claim 1, wherein the step of determining the time instant comprises steps of
   synchronizing the brake chopper with control periods of the inverter control, and
   receiving information from the used zero vector from a modulator.

7. A brake chopper control arrangement, the brake chopper being connected between the positive and the negative rails of an intermediate voltage circuit feeding an inverter bridge, wherein current measurement means are arranged between a DC voltage source and the brake chopper and adapted to measure DC current flowing in the intermediate voltage circuit, wherein the arrangement comprises:
   means for determining a time instant when the DC current of the intermediate circuit is sampled, and
   means for preventing the use of the brake chopper at the determined time instant.

8. A brake chopper control arrangement according to claim 7, wherein in the arrangement an output voltage vector in each control period is formed by using only one zero vector and one or two active vectors and the means for determining a time instant comprises means for choosing the time instant on the basis of the used zero vector such that the time instant is in the middle of the control period if the formed output voltage vector comprises a zero vector '000' and at the beginning or at the end of the control period if the formed output voltage vector comprises a zero vector '111'.

* * * * *